US006445801B1

(12) United States Patent
Pastor et al.

(10) Patent No.: US 6,445,801 B1
(45) Date of Patent: Sep. 3, 2002

(54) METHOD OF FREQUENCY FILTERING APPLIED TO NOISE SUPPRESSION IN SIGNALS IMPLEMENTING A WIENER FILTER

(75) Inventors: Dominique Pastor, Hengelo (NL); Gérard Reynaud, Bordeaux; Pierre-Albert Breton, Pessac, both of (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/196,138

(22) Filed: Nov. 20, 1998

(30) Foreign Application Priority Data

Nov. 21, 1997 (FR) ............................................ 97 14641

(51) Int. Cl.⁷ ................................................ H04B 15/00

(52) U.S. Cl. .................... 381/94.2; 381/94.3; 381/71.1; 381/7.11

(58) Field of Search ............................... 381/71.1, 94.1, 381/94.2, 94.7, 71.11, 71.12; 708/322; 370/290

(56) References Cited

U.S. PATENT DOCUMENTS 5,550,935 A * 8/1996 Erdem et al. ............... 382/260
5,610,991 A * 3/1997 Janse .......................... 381/92
5,740,256 A * 4/1998 Da Costa et al. .......... 361/94.7
5,943,429 A * 8/1999 Handel ...................... 381/94.2
6,128,594 A 10/2000 Gulli et al. ................. 704/244

FOREIGN PATENT DOCUMENTS

EP 0 534 837 3/1993

OTHER PUBLICATIONS

Levent Arslan, et al., "New Methods for Adaptive Noise Suppression", ICASSP, vol. 1, May 9, 1995, pp. 812–815.

John H.L. Hansen, et al., "Text–directed Speech Enhancement Employing Phone Class Parsing and Feature Map Constrained Vector Quantization", Speech Communication, vol. 21, No. 3, Apr. 1997. pp. 169–189.

T.S. Sun, et al., "Speech Enhancement Using A Ternary––Decision Based Filter", ICASSP, vol. 1, May 9 1995, pp. 820–823.

* cited by examiner

*Primary Examiner*—Duc Nguyen
*Assistant Examiner*—Lun-See Lao
(74) *Attorney, Agent, or Firm*—Oblon, Spivak, McClelland, Maier & Neustadt, P.C.

(57) ABSTRACT

The disclosed method uses the Wiener frequency filtering to suppress noise in noisy sound signals (u(t)). This method includes a preliminary step in which the sound signals (u(t)) to be noise-suppressed are digitized by sampling and subdivided into frames. The method then includes a first series of steps including the creation of a noise model on N frames, the estimating of the spectral density of the noise and of the energy of the noise model and the computing of a coefficient that reflects the statistical dispersion of the noise. It also includes a second series of steps including the computation of the spectral density of the signals to be noise-suppressed fore each frame. The coefficients of the Wiener filter are modified for each successively processed frame, by the parameters determined at the end of the two series of steps, so as to introduce an energy compensation and an adaptive overestimation of the noise.

9 Claims, 5 Drawing Sheets

FIG.1
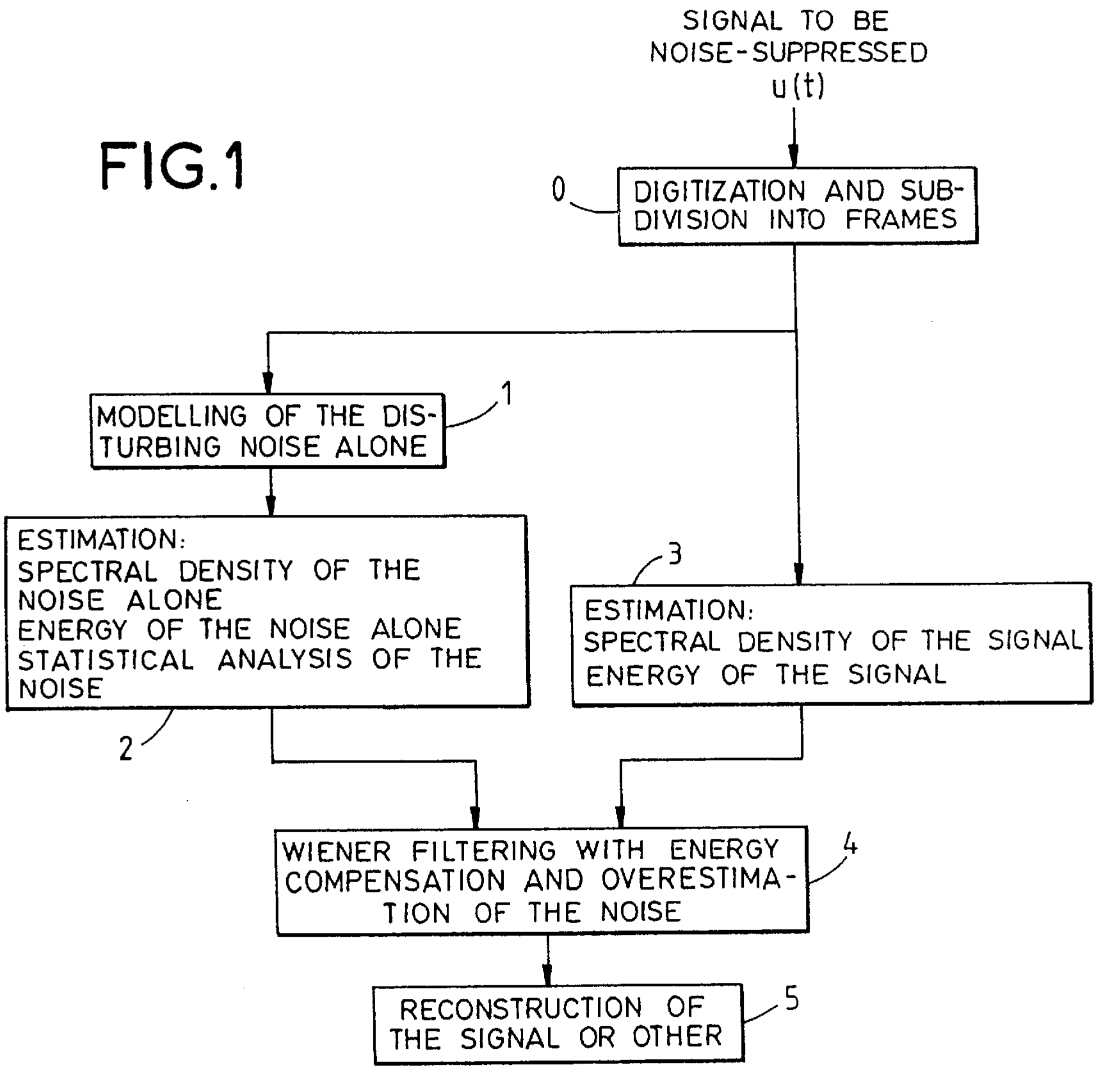
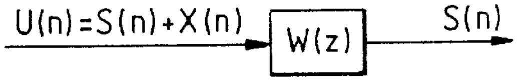
FIG.2

METHOD OF FREQUENCY FILTERING APPLIED TO NOISE SUPPRESSION IN SIGNALS IMPLEMENTING A WIENER FILTER

BACKGROUND OF THE INVENTION

1. Field of the Invention

The present invention relates to a method of frequency filtering implementing a Wiener filter.

It can be applied especially but not exclusively to noise suppression in sound signals containing speech picked up in noisy environments and more generally to noise suppression in all sound signals.

The main fields relate to telephone or radiotelephone communications, voice recognition, sound pick-up systems on civilian or military aircraft and, more generally, on all noisy vehicles, on-board intercommunications, etc.

As a non-restrictive example, in the case of an aircraft, noise results from the engines, the air-conditioning system, the ventilation of the on-board equipment or aerodynamic noise. All these noises are picked up, at least partially, by the microphone in which the pilot or any other member of the crew is speaking. Furthermore, for this type of application in particular, one of the characteristics of noises is that they are highly variable in time. Indeed, they are highly dependent on the operating conditions of the engines (take-off phase, stabilized state, etc.). The useful signals, namely the signals representing conversations, also have particular features: they are most usually short-lived.

Finally, whatever the application considered, if we look at the question of "voicing", it is possible to highlight certain particular features. As is known, voicing relates to elementary characteristics of portions of speech and more specifically to vowels as well as to some of the consonants: "b", "d", "g", "j", etc. These letters are characterized by an audiophonic signal with a pseudo-periodic structure.

In speech processing, it is common to consider that the stationary states, especially the above-mentioned voicing, are set up on durations of 10 to 20 ms. This time interval is characteristic of the elementary phenomena of the production of speech and shall hereinafter called a frame.

It is therefore common for the noise-suppression methods to take account of this major characteristic of sound signals comprising speech.

These methods generally comprise the following main steps: a subdivision into frames of the audiophonic signal to be subjected to noise suppression, the processing of these frames by a Fourier transform (or similar transform) operation in order to go into the frequency domain, the noise-suppression processing operation proper by means of digital filtering and a processing operation, that is dual to the first one, using a reverse Fourier transform is used to return to the temporal domain. The final step consists of a reconstruction of the signal. This reconstruction may be obtained by multiplying each of the frames by a weighting window.

One of the digital filters most commonly used for this type of application is the Wiener filter, especially a so-called optimal Wiener filter. This filter has the advantage of processing the successive frames in a differentiated way.

In other words, and more generally, the optimal Wiener filtering is at the center of the optimal signal processing methods based on second-order statistical characteristics and therefore on the notion of correlation.

Wiener filtering enables the separation of the signals by decorrelation. Its importance is related to the simplicity of the theoretical computations. Furthermore, it can be applied to a multitude of particular processes and especially, with regard to the preferred application aimed at by the invention, it can be applied to the removal of a noise that is polluting a speech signal.

2. Description of the Prior Art

However, in the prior art, a standard problem encountered during noise suppression by Wiener filtering is the presence of a noise, called a musical noise, that causes deterioration in the perception of the noise-suppressed signals, namely signals from which the noise has been cleared. This musical noise is due to the fluctuations of the spectral densities of the noise present in the input signal. For certain frames, indeed, the spectral density of the noise is greater, at least on one frequency channel, to that of the noise model used in these techniques. In this case, the mechanisms proper to the Wiener filtering prompt the appearance of a residual noise on the noise-suppressed signal. This residual noise is particularly unpleasant from the viewpoint of perception owing to its instability. Indeed, when listening to a speech signal, it is possible to distinguish residual noises in 'rumbles' similar to distortions that can be attributed to a high variability of the noise polluting the noise-suppressed speech signal or "useful" signal.

The invention is therefore aimed at overcoming the drawbacks of the prior art filtering methods, especially the main drawback that has just been recalled: the presence of parasitic residual noise in the noise-suppressed signal, known as "musical noise". The invention is aimed more generally, in its main application, at increasing the intelligibility of speech.

In order to highly attenuate the effects of musical noise, the invention derives benefit from the following two experimental observations:

- the probability of musical noise is all the greater as the estimate of the spectral density of the noise is unstable from one frame to another;
- the probability of the presence of musical noise is all the greater as the estimate of the spectral density of the noise is small in comparison to its real spectral density.

According to a major characteristic of the invention, the Wiener filter used for the digital filtering is modified in an optimized way by the introduction therein of an energy compensation term aimed at overestimating the noise level. Furthermore, this compensation term is adaptive.

SUMMARY OF THE INVENTION

An object of the invention therefore is a method of frequency filtering for the removal of noise from noisy sound signals formed by sound signals called useful signals mixed with noise signals, the method comprising at least one step for the subdivision of said sound signals into a series of identical frames of a specified length and a step for frequency filtering by means of a Wiener filter, wherein the method furthermore comprises the following steps:

- the preparation, from said noisy signals, of a model of noise on a specified number N of said frames, N being included between minimum and maximum predetermined limits;
- the application of a Fourier transform to said N frames;
- the estimation, for each frame of said model, of the spectral density of this frame;
- the estimation of the mean spectral density of said noise model;
- the computation, on the basis of these two estimations, of a statistical overestimation coefficient, said statistical coefficient being equal to the maximum ratio, for said N frames of the noise model, between the maximum spectral density of a considered frame of said noise model and the maximum estimated spectral density of the noise model;

the estimation, for each frame of said signals to be noise-suppressed, namely cleared of noise, of its spectral density; and the modification, for each frame of said signals to be noise-suppressed, of the coefficients of said Wiener filter so that the following relationship is verified:

$$W(\nu) = \left(1 - \alpha \cdot \max \cdot \frac{\gamma_x(\nu)}{\gamma_u(\nu)}\right)^{\beta'}$$

wherein α and β are predetermined fixed coefficients known as a static energy compensation coefficient and a exponential attenuation coefficient respectively, ν describes all the frequency channels of said Fourier transform, γu(ν) being the estimate of the spectral density of the frame to be noise-suppressed, γx(ν) is said spectral density of the noise model and max is said statistical overestimation coefficient modifying the static coefficient of energy compensation α.

BRIEF DESCRIPTION OF THE DRAWINGS

The invention will be understood more clearly and other features and advantages shall appear from the following description made with reference to the appended figures, of which:

FIG. 1 provides an illustration, in the form of a block diagram, of the main steps of the method according to the invention;

FIG. 2 provides a schematic illustration of a prior art Wiener filter;

MORE DETAILED DESCRIPTION

Figure 3:
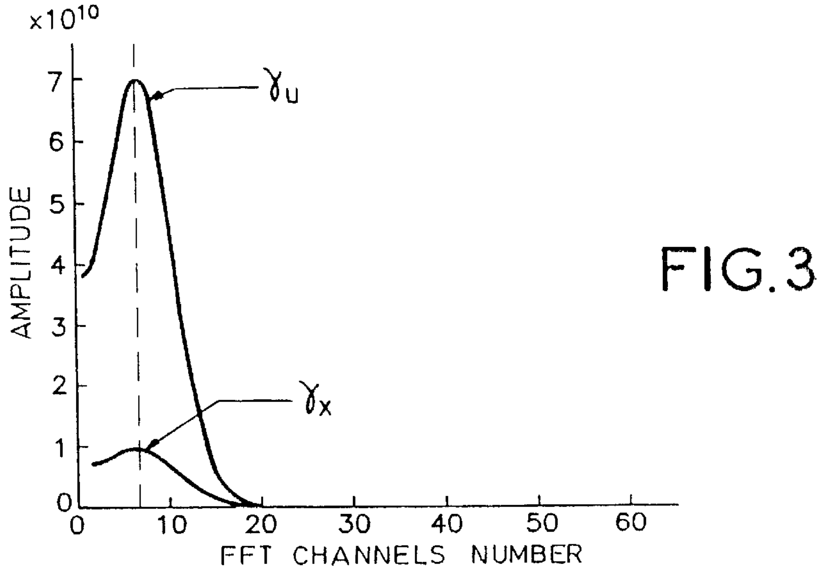
FIG. 3 is a graph illustrating the spectral density of a noise model and the spectral densities γu of each frame of this noise model.

The main phases and steps of the method according to the invention shall now be described with reference to the block diagram of FIG. 1. Each block, referenced 0 to 5, represents a phase of the method, which itself can be divided into elementary steps.

Hereinafter, to provide a clear picture and without in any way thereby limiting the scope of the invention, the description shall be set in the context of the processing of noisy speech. As stated here above, it is common practice to consider that the stationary states, especially voicing, are established on durations of 10 to 20 ms, a time interval that is characteristic of the elementary phenomena of speech production and shall be described hereinafter as a "frame".

As in the prior art, the method of the invention comprises a step for the subdivision into frames of the audiophonic signal to be noise-suppressed or cleared of noise (block 0).

In practice, digital techniques are implemented. Thus, the frame signals are not "continuously developing" signals but discrete signals obtained by sampling. It is assumed that the signals are sampled at the period $T_e$ before digital processing. It is common practice then to consider $2^p$ samples for a signal frame in choosing p so that the value $2^p$Te is of the magnitude of the duration D of a frame. For example, for a sampling frequency of 10 kHz, it is often the practice to chose 12.8 ms frames so as to be able to have 128 points available for each frame. This gives a power of two. The number of samples corresponding to a frame will hereinafter be called LGframe. The following relationship; $D = LGframe \times T_e$ is therefore met. The step of subdivision into frames, as shown in FIG. 1, is therefore preceded by a step of digitization by sampling.

By convention, the input signal will be called u(t), the useful signal s(t) and the disturbing noise x(t) in such a way that:

$$u(t)=s(t)+x(t) \text{ in continuous time} \quad (1)$$

$$u(kT_e)=s(kT_e)+x(kT_e) \text{ in discrete time} \quad (2)$$

The steps of digitizing and subdividing into frames (block 0) are common to the prior art. The digital samples thus created are arranged in a circulating first-in-first-out (FIFO) type buffer memory so as to be read in the form of successive frames.

The frames successively read then undergo a series of independent processing steps according to two channels that may be called "parallel" channels.

The operations performed in the block 1 consist of the identifying of those segments of the signal to be cleared of noise that contain only noise. The output of this block is formed by a sequence of digital samples representing noise alone. In other words, a noise model is prepared from the noisy signals, or more specifically from the successive frames read (block 0). Many methods can be implemented and an exemplary method of searching for noise models shall be explained here below.

In the block 2, three steps are carried out and, on the basis of the samples given by the block 1, consist of:

the estimation of the mean spectral density of the noise (for example by mean spectrum and smooth correlogram);

the determining of the mean energy of the noise model; and and the determining of a coefficient expressing this statistical dispersion of the noise.

The above steps and especially the last step which constitutes one of the main characteristics of the invention shall be described in detail here below.

In the "parallel" branch, the block 3 has a step of estimation of the spectral density of the current signal frame and for the computation of its energy.

In the block 4, according to another essential characteristic of the invention, the coefficients of the frequency filter carrying out the removal of noise from the signal are determined in the manner that shall be explained in detail hereinafter. As indicated, the method of the invention is based on energy compensation and an overestimation of noise.

Finally, in the block 5, the noise-suppressed temporal signal is reconstructed by providing for the most efficient continuity possible between the frames. In applications other than the main application aimed at by the invention, the signals may be exploited as such by various methods such as automatic speech recognition. In itself, this phase of the method is common to the prior art, and there is no need to provided a detailed description of the method of reconstruction or exploitation of the output signals from the block 4.

According to the main characteristic of the invention, the method enables the modifying and optimizing of the coefficients of the Wiener filter used for the noise removal phase proper (block 4) so as to eliminate or at least greatly attenuate the parasitic noises known as "musical" noises.

As recalled, these noises can be attributed to two main causes:

a/ the probability of musical noise is all the greater as the estimate of the spectral densities of the noise is unstable from one frame to another;

b/ the probability of the presence of musical noise is all the greater as the estimate of the spectral density of the noise is low in relation to the real spectral density of the noise.

According to the invention, with reference to the cause a/, the dispersion is quantified by a coefficient derived from the analysis performed in the block 2, on the basis of the noise model prepared in the block 1.

Similarly, with reference to the cause b/, to reduce the influence of the spectral density of the noise, especially when it is low, the method according to the invention carries out an overestimation of this spectral density by the introduction therein of a degree of adaptivity in order to optimize the perception of the noise-suppressed signal.

Before providing a more detailed description of the method of the invention, it is useful to briefly recall the characteristics of a prior art Wiener filter.

FIG. 2 provides a very schematic illustration of a Wiener filter used to suppress noise in a noisy signal U(n).

The following is a non-exhaustive list of examples of works that describe Wiener filters and that may be advantageously consulted:

Yves THOMAS: "Signaux et systémes linéaires", (Linear Signals and Systems), MASSON (1994); and Francois MICHAUT: "Méthodes adaptatives pour le signal" (Adaptive Methods for Signals), Hermes (1992).

In FIG. 2, the following conventions are used:

U(n): discrete Fourier transform of the observed random process,. namely the noisy signal;

S(n): discrete Fourier transform of the "desired" process, to be estimated by linear filtering of U(n);

X(n): discrete Fourier transform of the additive noise polluting the useful signal;

$\hat{S}$(n): estimation of S(n) expressed in the Fourier domain with $\epsilon=\hat{S}-S$=estimation error (S being the real noise-suppressed signal); and W(z): estimation filter expressed in the frequency domain.

The optimal Wiener filter minimizes the distance between the random variables S(n) and $\hat{S}$(n) measured by the root mean square error J:

$$J=E[(S(n)-S^{\hat{}}(n))^2] \quad (3)$$

The minimizing of this criterion amounts to making the estimation error orthogonal to the observed signal. This is expressed by the principle of orthogonality:

$$E[\epsilon(n)\cdot U^*(n)]=0 \quad (4)$$

If we use the following notations:

$\gamma_S$ the spectral density of the useful signal, and $\gamma_X$ the spectral density of the parasitic noise, the Wiener filter is described by the following relationship:

$$W(n)=\frac{\gamma_s(n)}{\gamma_s(n)+\gamma_x(n)} \quad (5)$$

In taking account of the independence of S(n) and X(n), we obtain the following relationship:

$$\gamma_U=\gamma_S+\gamma_X \quad (6)$$

wherein $\gamma_U$ represents the spectral density of the observed signal.

The relationship describing the Wiener filter therefore finally becomes:

$$W(n)=\frac{\gamma_s(n)}{\gamma_s(n)+\gamma_x(n)}=1-\frac{\gamma_x(n)}{\gamma_u(n)} \quad (7)$$

In practice, it is this second formulation of the Wiener filter that is used, since it brings into play only directly accessible terms, namely firstly the noisy signal received from the block 3 and secondly the noise previously determined by the computation of the noise model (block 1).

It must be noted that the coefficients W(n) of the Wiener filter are always positive. If computation artifacts give rise to a negative value for a coefficient, then this coefficient is made equal to zero.

According to the prior art, the elimination of the additive noise by a method of spectral subtraction, as achieved by a Wiener filter, leads to the creation of so-called "musical" noises. In order to prevent the appearance of these parasitic noises which are unpleasant to the ear and harmful to the intelligibility of speech, or at least in order prevent their appearance to the utmost extent, according to an essential characteristic of the invention the coefficients of the Wiener filter are modified by means of parameters specified in the blocks 2 and 3 as shall now be described.

When the input signal contains only noise, the additional "musical noise" is present because, in practice, the estimation of the ratio $\gamma_s/\gamma_u$ fluctuates at each frequency, although in theory this ratio should be equal to unity whatever the frequencies. It is these errors of estimation that produce attenuating filters for which the variations of the coefficients are random, depending on frequencies and in the course of time.

To get a clear picture, we may consider the example of the removal of only one noise, sampled at 44 kHz. The spectral density $\gamma_x$ of a noise model chosen by means of this signal and the spectral densities $\gamma_u$ of each frame (with a length LGframe) of this noise are determined.

The variation of these two parameters is shown in the form of curves in the graph of FIG. 3, as a function of the number of fast Fourier transform FFT channels. To plot the curves, it has been assumed that the frame length was equal to 128 samples, that is LGframe=128.

This graph clearly shows that the shapes of the two curves $\gamma_x$ and $\gamma_u$ are similar but the two estimates show a sharp difference in amplitude. The main peak of $\gamma_u$ which is located at the frequency 2.75 kHz (64 FFT channels corresponding to 22 kHz, namely half a sampling frequency) has an amplitude about seven times greater than that of $\gamma_X$ located at the same frequency. This is the main reason for the. presence of the "musical" noises. When, for certain frequencies referenced ν, $\gamma_u(\nu)$ is far greater than $\gamma_x(\nu)$, this means in theory that the frame contains not only noise but also another signal part. In this case, the prior art Wiener filtering removes noise from the corresponding frame as if it contains useful speech signal. This leads to the presence of noise residues.

To prevent this parasitic effect, the method according to the invention modifies the coefficients of the Wiener filter in an optimized way and introduces an energy compensation term that artificially overestimates the level of the noise, with different levels of adaptivity of this compensation.

The coefficients of the modified Wiener filter are governed by the following relationship:

$$W(\nu) = \left(1 - \alpha \cdot \max \cdot \frac{E_x}{E_u} \cdot \frac{\gamma_x(\nu)}{\gamma_u(\nu)}\right)^{\beta} \tag{8}$$

Referring again to the relationship (7), it is easily seen that four new terms have been introduced, namely:

β: exponential attenuation coefficient;

α: static coefficient of energy compensation;

$E_x/E_u$: energy weighting ratio; and max: coefficient of statistical overestimation derived from the statistical analysis of the noise, on the basis of a noise model established during the phase of the method corresponding to the block 1.

Each of these terms shall now be explained.

The coefficient of exponential attenuation β is a term commonly used in the literature devoted to the field of digital filtering and especially to noise suppression. A typical value of this parameter is 0.5.

As a non-restrictive example, reference could be made to the article by L. Arslan, A. Mc Cree and V. Viswanathan, "New Methods for Adaptive Noise Suppression", IEEE, May 1995, pages 812–815.

The coefficient of static energy compensation α makes it possible to overestimate the noise and is especially relevant in the case of noise suppression alone. Indeed, a typical value of α=10 applied to the example of FIG. 3 increases the estimate of the mean noise spectrum $\gamma_x$ by about +10 dB. This makes it possible then to reduce the residual noise level, since the coefficients of the Wiener filter cannot be negative. If not, they are then set at zero.

However, if this modification is highly efficient to eliminate noise alone, it raises in turn problems when the frames to be noise-suppressed contain useful signals. While this useful signal has far greater energy than the noise, this multiplier coefficient α has no effect on the deterioration of this signal. If not, however, there may exist frequencies ν for which the useful signal frame has a level of energy that is non-negligible but close to that of the noise for the same frequencies. In this case, the multiplication by α of $\gamma_x(\nu)$ dictates Wiener coefficients W(ν) that are zero and therefore leads to a disappearance of the energy of the signal for these frequencies.

Figure 4A:
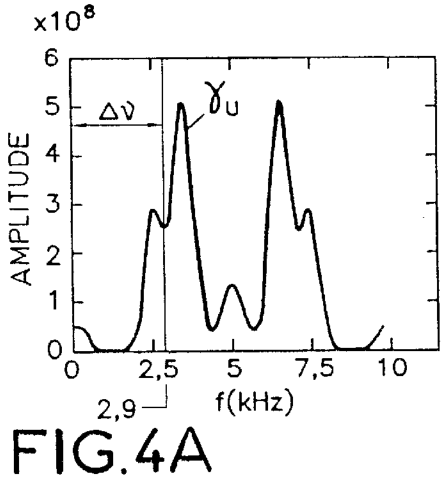
FIGS. 4*a* and 4*b* are comparative graphs illustrating these very same parameters with overestimation of the spectral density of the noise model.
Figure 4B:
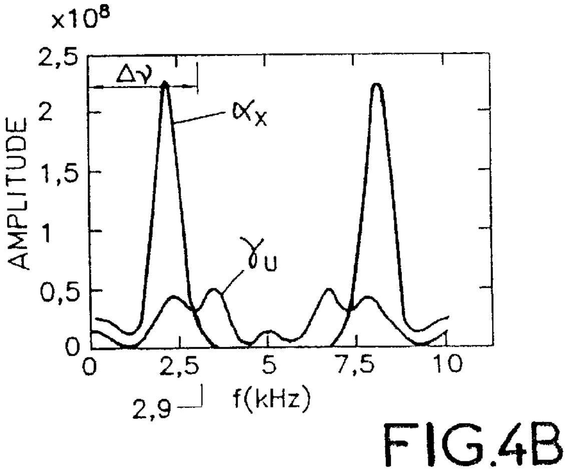

This problem is illustrated in FIGS. 4*a* and 4*b*. In these figures, the following conventions have been used:

$\gamma_u$: spectral density of the signal frame considered (low energy signal frame as compared with the noise); and $\gamma_x$: spectral density of the noise model chosen (block 1).

The curve of FIG. 4*a* makes it possible to note that the energy of the signal in frequency band Δν, represented by the spectral density $\gamma_x$, is not negligible.

Referring to FIG. 4*b*, it can be seen that the multiplication of $\gamma_x$ by the parameter α=10 makes $\alpha.\gamma_x$ greater than $\gamma_u$ in the Δν band. It follows that the Wiener gain is zero for this frequency band which no longer appears in the noise-suppressed frame.

The energy weighting ratio described here below makes it possible to reduce this distortion in the noise-suppressed signal.

As indicated here above, the suppression of the noise alone is appropriate, but may be excessively sudden in the parts of the useful signal.

In a preferred embodiment of the invention, this drawback is overcome by obtaining a variant in the coefficient α. This is done as a function of the presence or absence of a part of the useful signal in the signal to be cleared of noise. Advantageously, α remains close to a typical value equal to 10 when the noisy signal contains only noise, and it varies between 0 and 10 when a useful signal is present in the noisy signal. Advantageously, a degree of adaptativity is introduced.

This is the function that is assigned to the ratio $E_x/E_u$ which is multiplied by α in the relationship (8), a ratio in which $E_x$ is the mean energy of the noise model and $E_u$ is the energy of the current frame. This therefore enables the coefficients of the Wiener filter to change at each frame in a differentiated manner depending on the varyingly high presence (in terms of energy) of the speech signal.

If $E_x \cong E_u$, then $\alpha \cong 10$ and the frame is considered as the noise alone. It is properly noise-suppressed.

If on the contrary $E_x \ll E_u$, it means that the frame considered has very high energy as compared with the noise and that it is necessary to attenuate this signal part to the minimum.

Figure 5:
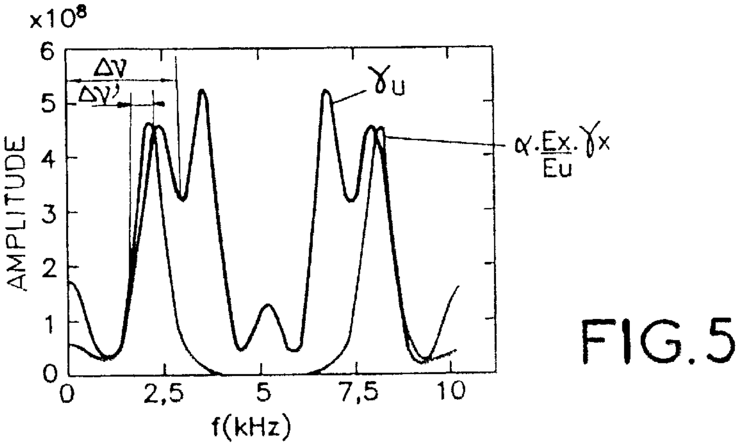
FIG. 5 is a graph illustrating these same parameters with adaptive overestimation of the spectral density of the noise model.

This third modification is illustrated in FIG. 5. In this figure, the signal frame considered is the same as the one used for the FIGS. 4*a* and 4*b:*

α=10 and $E_x/E_u=0.2$.

Through this weighting of the coefficient α by $E_{xx}/E_{uu}$, the Δν' frequency band in which the useful signal is eliminated (namely the frequencies for which the coefficients of $\gamma_x$ are greater than those of $\gamma_u$) is far smaller than it is during the modification by a multiplication of the coefficient α=10 alone.

This type of filter therefore has high efficiency in terms of the elimination of the deteriorated signal segments in which speech is absent and the diminishing of the distortions inflicted on the useful speech signal.

The probability of generation of "musical noise" is also related, as indicated, to the variance of the estimates of the spectral density of the noise on all the frames.

Indeed, the greater the variation of the estimated spectral densities of the noise from one phase to another, the greater is the probability of the formation of the "musical" noise.

According to another important aspect of the invention, the value of the coefficient of overestimation is made dependent on the statistical properties of the noise. To do this, a coefficient, hereinafter called max, is introduced. This coefficient max is proportional to the dispersion of the values of spectral densities of noise.

The coefficient of overestimation then becomes:

α=α*max with max meeting the following relationship:

$$\max = \operatorname*{Max}_{i=1 \ldots N}\left(\frac{\operatorname*{Max}_{\nu}(\gamma_i(\nu))}{\operatorname*{Max}_{\nu}(\gamma_x(\nu))}\right) \tag{9}$$

in which:

N is the number of frames of the noise model;

- ν describes all the frequency channels, namely LGframe/2 channels;
- $\gamma_i(\nu)$ is the spectral density of the $i^{th}$ frame of the noise model in the channel ν; and
- $\gamma_x(\nu)$ is the spectral density of the noise model.

The coefficient max is equal to the maximum ratio, for all the frames of the noise model, between the maximum of the spectral density of the frame of the noise model considered and the maximum of the estimated spectral density of the noise model.

In other words, this coefficient characterizes the maximum disparity of the noise for the frequency channels bearing a high level of energy. Multiplied by the coefficient α, it provides a complementary attenuation proportional to this disparity.

To prepare a part of the parameters entering into the modification of the coefficients of the Wiener filter, it is necessary to have available a noise model (block 1 of FIG. 1).

The preparation of a noise model of a noisy signal is a standard operation per se. However, the specific method implemented for this operation may be a prior art method as well as an original method.

Hereinafter, referring to FIGS. 6 and 7, which shall refer to a method for the preparation of a noise model that is especially suited to the main applications covered by the method of the invention, especially noise suppression in noisy speech signals.

The method relies on a permanent and automatic search for a noise model. This search is made on the signal samples u(t) digitized and stored in an input buffer memory. This memory is capable of simultaneously storing all the samples of several frames of the input signal (at least two frames and, in general, N frames).

The noise model sought is formed by a succession of several frames whose energy stability and relative energy level suggests that it is an ambient noise and not a speech signal or another disturbing noise. The way in which this automatic search is done will be seen further below.

When a noise model is found, all the samples of the N successive frames representing this noise model are preserved in the memory, so that the spectrum of this noise can be analyzed and can be used for noise suppression. However, the automatic noise search continues on the basis of the input signal u(t) in seeking, as the case may be, a more recent and more appropriate model either because it provides a more efficient representation of the ambient noise or because the ambient noise has evolved. The more recent noise model is stored instead of the previous one if the comparison with the previous one shows that it more closely represents the ambient noise.

The initial postulates for the automatic preparation of a noise model are the following:

- the noise to be eliminated is the ambient background noise,
- the ambient noise has a relatively stable energy in the short term,
- the noise is most usually preceded by a noise corresponding to the pilot's breathing which must not be mistaken for the ambient noise; however this breathing noise stops after some hundreds of milliseconds, before the first speech transmission itself, so that only ambient noise is found just before the speech transmission,
- and, finally, the noises and the speech are superimposed in terms of signal energy so that a signal containing speech and disturbing noise, including breathing in the microphone, necessarily contains more energy than an ambient noise signal.

The result thereof is that the following simple assumption will be made: the ambient noise is a signal having a stable minimum energy in the short term. The expression "short term" must be understood to mean a few frames, and it will be seen in the practical example given here below that the number of frames designed to assess the stability of the noise is 5 to 20. The energy must be stable over several frames, failing which it must be assumed that what the signal contains is rather speech or noise other than the ambient noise. It must be minimal. Failing this, it will be assumed that the signal contains breathing or phonetic speech elements resembling noise but superimposed on the ambient noise.

Figure 6:
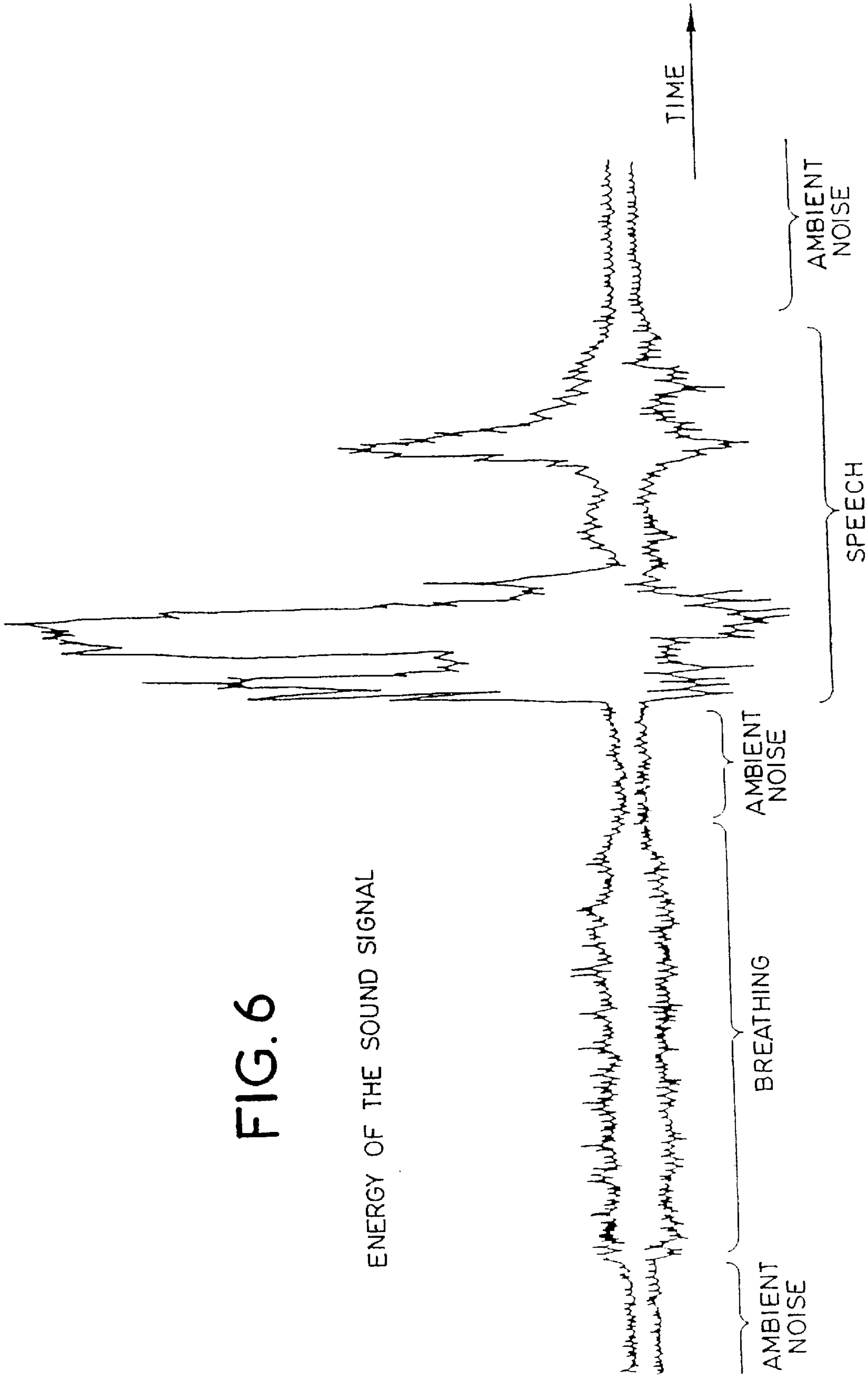
FIG. 6 shows a typical example of a signal coming from a pick-up of noisy sound.

FIG. 6 shows a typical configuration of the temporal progress of the energy of a microphone signal at the time of a start of speech transmission, with a phase of breathing noise that is extinguished for several tens of several hundreds of milliseconds to make place for an ambient noise alone, after which a high energy level indicates the presence of speech, with a final return to ambient noise.

The automatic search for the ambient noise than consists in finding at least N1 successive frames (for example N1=5) whose energy values are close to one another, i.e. the ratio between the signal energy contained in one frame and the signal energy contained in the preceding frame or preferably the preceding frames is located within a specified range of values (for example from 1/3 to 3). When a relatively stable succession of energy frames of this kind have been found, the numerical values of all the samples of these N frames are stored. This set of N×P samples forms the current noise model. It is used in the noise suppression. The analysis of the following frames continues. If another succession of at least N1 successive frames meeting the same conditions of energy stability (frame energy ratios in a specified range) is found, then the mean energy of this new succession of frames is compared with the mean energy of the stored model, and this mean energy of the stored model is replaced by the new succession if the ratio between the mean energy of the new succession and the mean energy of the stored model is smaller than a specified replacement threshold which may be 1.5 for example.

The result of this replacement of one noise model by a more recent model with less energy or not having far greater energy is that the noise model on the whole gets linked to the permanent ambient noise. Even before a beginning of speech, preceded by breathing, there is a phase where the ambient noise alone is present for a duration sufficient for it to be taken into account as an active noise model. This phase of ambient noise alone, after breathing, is short. The number N1 is chosen to be relatively low so that there is time available to reset the noise model on the ambient noise after the restoration phase.

If the ambient noise changes slowly, the change will be taken into account owing to the fact that the threshold of comparison with the stored model is greater than 1. If it changes more quickly in the upward direction, there is a risk that the evolution will not be taken into account so that it is preferable, from time to time, to provide for a reinitializing of the search for a noise model. For example, in an aircraft that is at a standstill on the ground, the ambient noise will be relatively low and, during the take-off phase, the noise model should not remains blocked in the state that it had when the aircraft was at a standstill through the fact that a noise model is replaced only by a model that has less energy or does not have far greater energy. The reinitializing methods envisaged shall be described further below.

Figure 7:
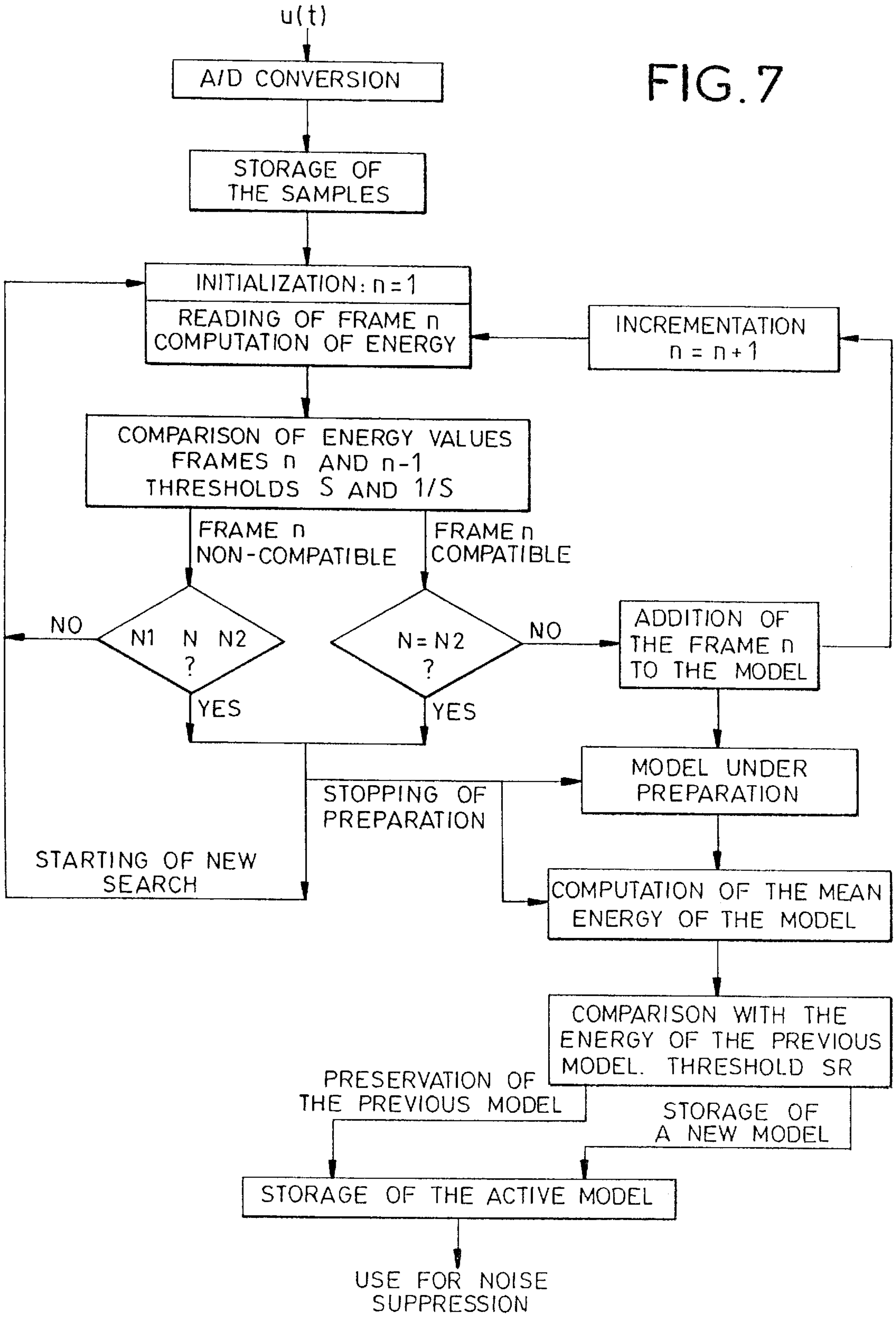
FIG. 7 is a flow chart showing the steps of a particular method of searching for a noise model.

FIG. 7 shows a flow chart of the operations of automatic searching for an ambient noise model.

The input signal u(t), sampled at the frequency $F_e=1/T_e$. and digitized by an analog-digital converter, is stored in a buffer memory capable of storing all the samples of at least two frames.

The number of the current frame in an operation of searching for a noise model is designated by n and is counted by a counter as and when the search continues. At the initialization of the search, n is set at 1. This number n will be incremented as and when a model of several successive frames is prepared. When the current frame n is analyzed, the model already, by assumption, comprises n−1 successive frames meeting the conditions laid down to form part of a model.

It shall be assumed, first of all, that this is a first preparation of a model, no previous model having been constructed. What happens for subsequent preparations shall be seen hereinafter.

The signal energy of the frame is computed by the summation of the squares of the digital values of the samples of the frame. It is kept in the memory.

Then, the following frame having the rank n=2 is read and its energy is computed in the same way. It is also kept in the memory.

The ratio between the energy values of the two frames is computed. If this ratio is contained between two thresholds S and S', one of which is greater than 1 while the other is smaller than 1, then it is assumed that the energy values of the two frames are close and that the two frames may form part of a noise model. The thresholds S and S' are preferably reversed with respect to each other (S'=1/S) so that it is enough to define one to have the other. For example, a typical value is S=3, S'=1/3. If the frames can form part of one and the same noise model, the samples that form them are stored to begin the construction of the model and the search continues by iteration in incrementing n by one unit.

If the ratio between the energy values of the first two frames is outside the interval laid down, then the frames are declared to be incompatible and the search is reinitialized by resetting n at 1.

Should the search continue, the rank n of the current frame is incremented and, in an iterative procedure loop, the energy of the next frame is computed and a comparison is made with the energy of the previous frame or the previous frames in using the thresholds S and S'.

It will be noted in this respect that two types of comparison are possible to add a frame to n−1 previous frames that have already been considered to be homogeneous in terms of energy: the first type of comparison consists in comparing only the energy of the frame n with the energy of the frame n−1. The second type consists in comparing the energy of the frame n with each of the frames 1 to n−1. The second method leads to greater homogeneity of the model but has the drawback of not taking sufficient account of the cases where the noise level increases or decreases rapidly.

Thus, the energy of the n ranking frame is compared with the energy of the n−1 ranking frame and possibly other previous frames (not necessarily all, as it happens).

If the comparison shows that there is no homogeneity with the previous frames, owing to the fact that the ratio of the energy is not included between 1/S and S, there are two possible cases:

- either n is smaller than or equal to a minimum number N1 below which the model cannot be considered to be significant of the ambient noise because the duration of homogeneity is too short (for example N1=5) in this case the model is abandoned during preparation and the search is reinitialized at the beginning by resetting n at 1;
- or else n is greater than the minimum number N1. In this case, since there is now a lack of homogeneity, it is assumed that there may be a beginning of speech after a homogeneous noise phase and, by way of a noise model, all the samples of the n−1 homogeneous noise frames that have preceded the lack of homogeneity are preserved. This model remains stored until the finding of a more recent model which also seems to represent the ambient noise. The search is reinitialized in any case by resetting n at 1.

However, the comparison of the frame n with the previous frames could have again led to observing a frame that was still homogeneous in energy with the preceding frame or frames. In this case, either n is smaller than a second number N2 (for example N2=20) which represents the maximum length desired for this noise model or else n has become equal to this number N2. The number N2 is chosen so as to limit the computation time in the subsequent operations for the estimation of spectral noise density.

If n is smaller than N2, the homogeneous frame is added to the previous ones to contribute to the construction of the noise model, n is incremented and the next frame is analyzed.

If n is equal to N2, the frame is also added to the n−1 previous homogeneous frames and the model of n homogeneous frames is stored to serve in the elimination of the noise. The search for a model is furthermore reinitialized in resetting n at 1.

The previous steps relate to the first search for a model. But once a model has been stored, it may be replaced at any time by a more recent model.

The condition of replacement is again a condition of energy but this time it relates to the mean energy of the model and no longer to the energy of each frame.

Consequently, if a possible model has been found, with N frames where N1<N<N2, the mean energy of this model which is the sum of the energy of the N frames divided by N is computed, and it is compared with the mean energy of the N' frames of the previously stored model.

If the ratio between the mean energy of the possible new model and the mean energy of the present model in force is below a replacement threshold SR, the new model is considered to be better and it is stored in the place of the previous model. If not, the new model is rejected and the former model remains in force.

The threshold SR is preferably slightly higher than 1.

If the threshold SR were to be lower than or equal to 1, the least energetic homogeneous frames would be stored at each time. This actually corresponds to the fact that the ambient noise is considered to be the minimum below which the energy level never drops. However, any possibility of changes in the model will be eliminated if the ambient noise begins to increase.

If the threshold SR were to be excessively above 1, there would be a risk of poorly distinguishing between the ambient noise and other disturbing noises (breathing) or even certain phonemes that resemble noise (sibilant consonants or hushing consonants for example). The elimination of noise by means of a noise model linked to breathing or to the sibilant or hushing consonants would then risk harming the intelligibility of the noise-suppressed signal.

In a preferred example, the threshold SR is about 1.5. Above this threshold, the old model will be kept. Below this threshold, the old model will be replaced by the new one. In both cases, the search will be reinitialized by recommencing the reading of a first frame of the input signal u(t) and putting n at 1.

To make the elaboration of the noise model more reliable, it may be planned that the search for a model will be inhibited if a noise transmission is detected in the useful signal. The digital signal processing operations commonly used in speech detection make it possible to identify the presence of speech from the characteristic spectra of periodicity of certain phonemes, especially the phonemes corresponding to voiced vowels or consonants.

The purpose of this inhibition is to prevent certain sounds from being taken for noise when they are in fact useful phonemes, prevent a noise model based on these sounds from being stored and prevent the elimination of all the similar sounds through the suppression of noise subsequent to the preparation of the model.

Furthermore, it is desirable to plan from time to time for a resetting of the search for the model to enable an updating of the model when the increases in ambient noise have not been taken into account owing to the fact that SR is not far greater than 1.

The ambient noise may indeed increase greatly and rapidly, for example during the phase of acceleration of the engines of an aircraft or another air, earth or sea vehicle. However, the threshold SR requires that the previous noise model should be kept when the mean noise energy increases at excessively high speed.

If it is desired to overcome this situation, it is possible to proceed in different ways, but the most simple way is to reinitialize the model periodically by searching for a new model and laying it down as an active model independently of the comparison between this model and the previously stored model. The periodicity can then be based on the mean duration of elocution in the application envisaged. For example, the durations of elocution are on an average equal to some seconds for the crew of an aircraft, and the reinitialization may take place with a periodicity of some seconds.

The implementation of the method of preparation of a noise model (FIG. 1: block 1) and more generally of the method according to the invention can be done by means of non-specialized computers provided with the requisite computing programs and receiving samples of digitized signals, as given by an analog-digital converter, through an adapted port.

This implementation can also be done by means of a specialized computer based on digital signal processors, enabling the faster processing of a greater number of digital signals.

As is well known, the computers are associated with different types of memories, namely static and dynamic memories, to record the programs and intermediate data elements as well as to FIFO type circulating memories. Finally, the system comprises an analog-digital converter, for the digitizing of the signals u(t), and a digital-analog converter if need be, if the noise-suppressed signals have to be used in analog form.

Figure 8:
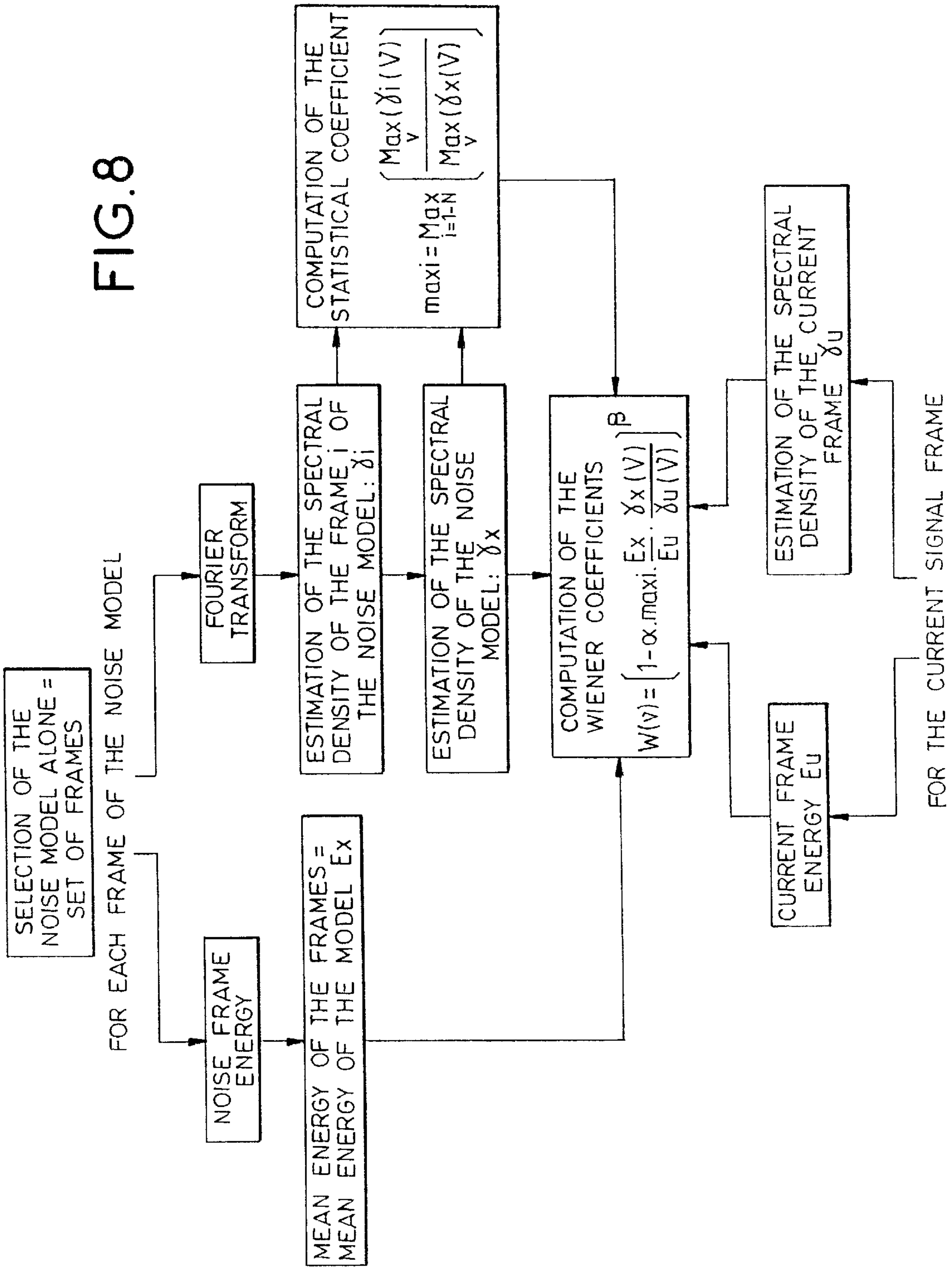
FIG. 8 is a detailed flow chart representing the steps of the digital filtering method according to a preferred embodiment of the invention.

In conclusion, and to provide a more detailed description of the method of the invention, it is possible to subdivide the steps differently from what has been described with reference to FIG. 1 (which illustrates the method more synthetically). FIG. 8 is a diagram summarizing all the steps of the filtering method according to the invention in a preferred embodiment.

These steps are divided into a first sub-group of steps to specify the parameters depending on the noise model and a second sub-group of steps to determine the parameters depending only on the current phase of the signal to be noise-suppressed.

The first step of the first sub-group comprises an initial step for the selection of a noise model adapted to the specific application, advantageously a noise model specified by the method described here above with reference to FIGS. 6 and 7.

This first sub-group of steps comprises two branches.

In the first branch, the energy of the frame is computed for each frame of the noise model (in the temporal domain), and then the mean energy of the frames of the model are computed. This enables an estimation of the mean energy of the model, namely the parameter $E_x$.

In the second arm, a Fourier transform is applied to the frames of the noise model, so as to pass into the frequency domain. Then, the spectral density of the frame i (with i=1 . . . N) of the noise model in the frequency ν, that is $\gamma_i(\nu)$, and the spectral density of the noise model in the frequency channel ν, that is $\gamma_x(\nu)$ are determined successively. From these two parameters, the statistical coefficient max is determined in such a way that it verifies the relationship (9). The parameter $\gamma_x(\nu)$ is also used to compute one of the other coefficients of the Wiener filter.

The second sub-group of steps also comprises two branches.

In the first branch, the energy of the current frame, namely $E_u$, is determined and in the second branch the spectral density of the current frame $\gamma_u$ is estimated.

From these two parameters and from the parameters $\gamma_x$ and $E_x$ determined here above, the coefficients $[E_x/E_u]$ and $[\gamma_x(\nu)/\gamma_u(\nu)]$ are obtained.

All the coefficients of the Wiener filter according to the relationship (8) are therefore determined at the end of these steps. The coefficients α and β are predetermined fixed coefficients typically equal to 10 and 0.5 respectively.

It can be seen from the above description that the invention truly attains the goals that have been set for it.

It must be clear however that the invention is not limited solely to the exemplary embodiments explicitly described, especially with reference to FIGS. 1 to 8.

In particular, the numerical examples have been given only to specify the invention more clearly but are essentially related to the specific application envisaged. Consequently, they form part of a simple technological choice that is within the scope of those skilled in the art.

Furthermore, as recalled, the invention cannot be limited solely to the domain of the filtering of signals containing noisy speech even if this domain constitutes one of its preferred applications.

What is claimed is:

1. A method of frequency filtering for the removal of noise from noisy sound signals (u(t)) formed by sound signals mixed with noise signals, the method comprising:

at least one step of subdividing said sound signals into a series of identical frames of a specified length;

frequency filtering the subdivided sound signals by a Wiener filter;

preparing from said noisy signals (u(t)) a model of noise on a specified number N of said frames, N being included between predetermined minimum and maximum limits;

applying a Fourier transform to said N frames;

estimating, for each frame of said model, the spectral density of the frame;

estimating a mean spectral density of said noise model;

computing based on the two estimations, a statistical overestimation coefficient, said statistical coefficient being equal to the maximum ratio, for said N frames of the noise model, between a maximum spectral density of a considered frame of said noise model and a maximum estimated spectral density of the noise model;

estimating, for each frame of said signals to be noise-suppressed (u(t), its spectral density; and modifying, for each frame of said signals to be noise-suppressed (u(t)), coefficients of said Wiener filter so that the following relationship is verified:

$$W(\nu) = \left(1 - \alpha \cdot \max \cdot \frac{\gamma_x(\nu)}{\gamma_u(\nu)}\right)^{\beta'}$$

wherein α and β are predetermined fixed coefficients known as a static energy compensation coefficient and an exponential attenuation coefficient respectively, ν describes all frequency channels of said Fourier transform, $\gamma_u(\nu)$ is the estimate of the spectral density of the fame to be noise-suppressed, $\gamma_x(\nu)$ is said spectral density of the noise model and max is said statistical overestimation coefficient modifying the static coefficient of energy compensation α.

2. A method according to claim 1, wherein said statistical coefficient max verifies the following relationship:

$$\max = \underset{i=1 \ldots N}{\mathrm{Max}} \left( \frac{\underset{\nu}{\mathrm{Max}}(\gamma_i(\nu))}{\underset{\nu}{\mathrm{Max}}(\gamma_x(\nu))} \right)$$

3. A method according to claim 1, comprising:

computing a mean energy of said noise model $E_x$;

computing, for each frame of said signals to be noise-suppressed (u(t)), an energy of the frame in progress $E_u$; and multiplying said static coefficient of energy compensation α by an energy weighting coefficient equal to the ratio $E_x/E_u$, so as to selectively modify these coefficients for each frame of said signals to be noise-suppressed (u(t)) by applying a coefficient that is continuously variable between a maximum value and a minimum value, the maximum value being substantially equal to unity when said sound signals are absent from said signals to be noise-suppressed (u(t)) and substantially equal to zero when the energy of said sound signals is far greater than the energy of said noise signals, wherein said coefficients of the Wiener filter meet the following relationship:

$$W(\nu) = \left(1 - \alpha \cdot maxi \cdot \frac{E_x}{E_u} \cdot \frac{\gamma_x(\nu)}{\gamma_u(\nu)}\right)^{\beta}$$

4. A method according to claim 1, wherein said static coefficient of energy compensation α is equal to 10.

5. A method according to claim 1, wherein said exponential attenuation coefficient β is equal to 0.5.

6. A method according to claim 1, further comprising an initial step of digitizing said signals (u(t)) to be noise-suppressed by sampling, each frame comprising p samples.

7. A method according to claim 6, wherein said noise model is obtained by a repetitive search made permanently in said signals to be noise-suppressed (u(t)), by seeking N successive frames, with p samples each, having the expected characteristics of a noise, in storing the N×P corresponding samples to constitute said noise model, and in reiterating the search for a new noise model and store the new model to replace the previous one or keep the previous model according to the respective characteristics of the two models.

8. An application of the method according to claim 1 to noise-suppression in noisy speech signals (u(t)).

9. An application of the method according to claim 8, wherein the duration of said frames is in the 10 to 20 ms range.

* * * * *